United States Patent [19]

Maier

[11] Patent Number: 4,508,371
[45] Date of Patent: Apr. 2, 1985

[54] EASY ACCESS PULLEY BOX

[76] Inventor: William Maier, 465 Gulf St., Milford, Conn. 06460

[21] Appl. No.: 462,998

[22] Filed: Feb. 1, 1983

[51] Int. Cl.³ .............................................. F16L 45/00
[52] U.S. Cl. .................................. 285/121; 285/127; 285/DIG. 2; 285/DIG. 22; 220/306
[58] Field of Search ............... 285/121, 122, 123, 124, 285/125, 126, 127, 179, DIG. 2, DIG. 22; 220/306

[56] References Cited

U.S. PATENT DOCUMENTS

| 534,021 | 2/1895 | Swan . |
| 1,627,076 | 5/1927 | Caracristi . |
| 1,669,447 | 5/1928 | Boyton et al. . |
| 1,681,097 | 8/1928 | Church . |
| 2,665,353 | 1/1954 | Popp . |
| 2,955,851 | 10/1960 | Scott . |
| 3,042,378 | 7/1962 | Preston . |
| 3,240,384 | 3/1966 | Lermer .................................. 220/306 |
| 3,733,577 | 5/1973 | Hammond .................. 285/DIG. 22 |
| 3,884,385 | 5/1975 | Schaefer . |
| 4,073,514 | 2/1978 | Pate . |

FOREIGN PATENT DOCUMENTS

| 1038528 | 9/1953 | France . |
| 14746 | 7/1915 | United Kingdom ................ 285/127 |
| 124082 | 3/1919 | United Kingdom ................ 285/179 |

Primary Examiner—Dave W. Arola
Attorney, Agent, or Firm—Munson H. Lane, Jr.

[57] ABSTRACT

A cover plate for an easy access pulley box conduit coupler has pairs of split ear elements extending normal thereto, which each define a slot structure. A pulley shaft extends through opposed walls of the pulley box. In assembly of the box and the cover plate, each slot structure snap fits onto an extended end of said pulley shaft.

7 Claims, 6 Drawing Figures

EASY ACCESS PULLEY BOX

This invention relates to the combination of an easy access housing and mechanism therein and a cover plate therewith.

The invention is particularly illustrated by an easy access pulley box conduit coupler and the cover plate therewith.

BACKGROUND OF THE INVENTION

Conduit fittings which comprise a housing and a mechanism therein, as for instance comprising a pulley box or a valve box, are well known in the arts.

For instance, the U.S. patents to Caracristi, No. 1,627,076, issued May 3, 1927, and to Preston, No. 3,042,378, issued July 3, 1962, each disclose a split type pulley box housing wherein the pulley shaft comprises the bolt that locks the split housing parts and that to Swan No. 534,021, issued Feb. 12, 1895, discloses essentially a one-piece pulley box housing.

None of these housing disclose an access cover plate. Access to these housings, as for instance to string a cable or a wire, requires entry through one of the conduits thereof.

Other known fittings of the type which do include cover plates for access to the housings, generally rely on threaded means to secure the cover plate; see for instance each of the U.S. patents to Church Nos. 1,681,097, issued Aug. 14, 1928, Scott 2,955,851, issued Oct. 11, 1960 and French Pat. No. 1,038,528. These devices obviously require threaded means incorporated in the housing structure and either threaded means on the cover plate or separate screw means. Further, these devices require an adequate work space for tool manipulation for access purposes.

Other fittings and covers of the type rely on interlocking beads, cleats or lugs to secure the cover plates; see the U.S. patents to Pate Nos. 4,073,514, issued Feb. 2, 1973 and Popp No. 2,665,353, issued Jan. 5, 1954. Such securing means require the fabrication of parts that increase costs.

The U.S. patent to Schaeffer No. 3,884,385, issued May 20, 1975, secures a cover plate on a fitting box of the type, by means of an extension on the cover plate that is forced to a locking position behind shoulder means formed in tab structure which extends from the box and thereafter permanently deforming said tabs to ensure fastening or in the case of resilient tabs, removing the cover plate only by the use of tool means.

Boynton et al, U.S. Pat. No. 1,669,447, issued May 15, 1928, in a fitting box of the type utilizes a channeled slide cover plate and a spring retaining means therewith. The combination of these parts of course results in increased costs and manipulative problems where space is limited.

SUMMARY OF THE INVENTION

In contradiction to the aforenoted known means, it is an object of this invention to provide a housing and mechanism therein comprising a conduit fitting and cover plate therewith; which combination is relatively less expensive to manufacture; which fitting cover plate is genrally more easily and quickly assembled and secured to the fitting body and disassembled therefrom; which assembly of parts requires only a minimum space and does not require tool means to effect such assembly and disassembly; and which cover plate structure incorporates guide means to facilitate placement for securing purposes.

In one aspect, the aforegoing object of the invention is effected by a cover plate means which has pairs of split ear elements extending generally normal thereto and which snap over nib or boss elements extending from the fitting body.

In another aspect of the invention, the nibs or boss elements are extensions of a shaft or spindle means upon which a pulley member is mounted; the latter comprising the mechanism disposed within the housing.

In another aspect of the invention, the split ear elements are chamfered at the free inner ends thereof and thus function as guide means for entry of the shaft or spindle ends when assembling the cover.

BRIEF DESCRIPTION OF THE INVENTION

DETAILED DESCRIPTION OF THE PREFERRED EMBODIMENT OF THE INVENTION

Figure 1:
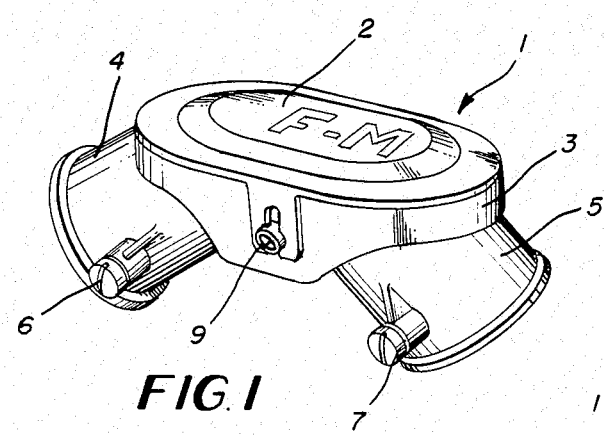
FIG. 1 is a perspective view of one embodiment of the assembled housing and mechanism therein.
Figure 3:
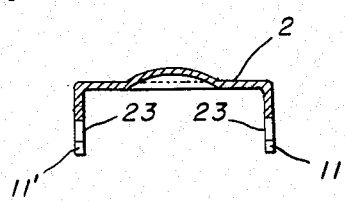
FIG. 3 is a cross-section of the cover plate taken along cut line 3—3 of FIG. 2.
Figure 2:
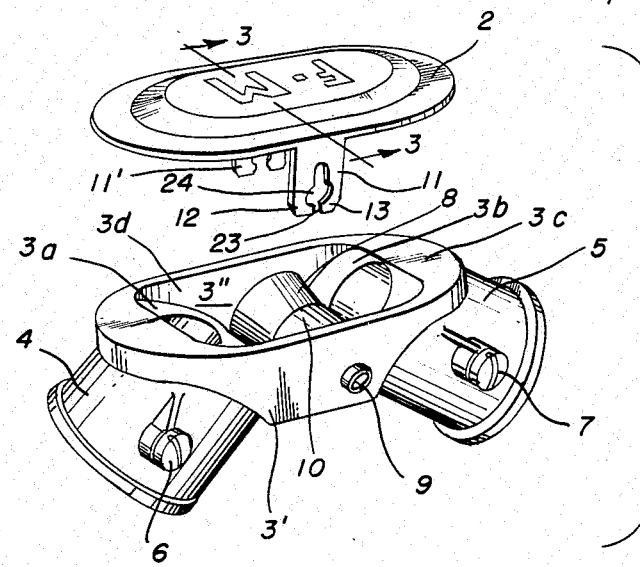
FIG. 2 is an exploded view of the FIG. 1 structure utilized as a pulley box.

Referring to the drawing one preferred embodiment of the invention, illustrated in FIGS. 1 through 4, is a pulley box in the form of an elbow-shaped, conduit coupler 1. The conduit coupler 1 comprises an elongated hollow body 3 defined by spaced opposite side walls 3',3", angled opposite end walls 3a,3b, and a flat top 3c having an access opening 3d therein. Cylindrical conduit fitting elements 4 and 5, integral with the body 3, extend at generally 45° thereto and communicate with the body interior through the angled end walls 3a, 3b respectively. Screw means 6 and 7 extend through the fitting elements 4 and 5 respectively and provide locking means for securing conduits (not shown) in the fitting elements. A flat, removable cover plate 2, shaped to conform with the shape of the top 3c of the hollow body 3, covers the access opening 3d. The mechanism disposed in the fitting body 3, in this instance, comprises a pulley 8 mounted on a shaft or spindle means 9 and preferably provided with a center groove 10 which functions as a cable or wire guide. Only the near side body wall is shown in FIG. 2, but it is understood that the shaft extends through each of the opposed body walls and is preferably inserted in a force fit.

Figure 4:
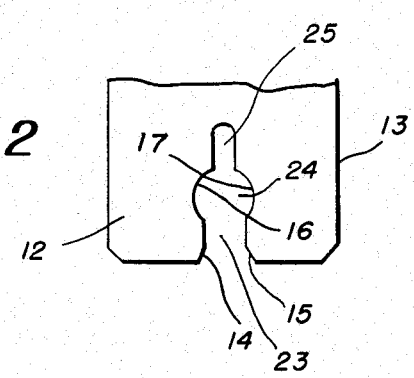
FIG. 4 is a partial detailed view of a pair of the split ears of the cover plate.

Novel and patentably distinct fastener means 11,11' are integral with the cover plate. Each means 11,11' extends normal from the cover plate and comprises a pair of split ear elements 12,13 defining slot means 23 which in assembly are aligned with and adapted to receive an end of said pulley shaft extending through the body wall. As shown in FIG. 4, the open end of the slot defining ear structure diverges at 14,15 whereby to guide and facilitate reception of the associated shaft end. The slot structure is further provided with arcuate cut-out sections 16,17 and the slot defining structure is dimensioned relative to the shaft end to be associated therewith so as to provide a snap fit of the shaft into said arcuate section. The center hole 24 in the slot means 23, defined by the arcuate cut-out sections, is of a diameter smaller than the diameter of the pulley shaft 9 and the slot extension 25 above the center hole 24 allows some resilient spreading of the split ear elements 12,13 permitting the split ears 11 and 12 to snap into place over the projecting ends of the pulley shaft 9, thereby holding the cover 2 securely in place over the access opening 3d and body top 3c.

Thus, is provided a quick and easy access to the housing body and a removable cover plate having fastening means which provides a positive and easily manipulable locking assembly, requires a minimum of parts and elements in the fabrication thereof, requires no tools for the assembly or disassembly thereof, and requires no fastening means which are separable from and independent of the aforesaid body, mechanism therein and the cover plate.

It is pointed out that while the housing body could include integral nibs or boss elements to associate with the split ears of the cover plate, instead of the illustrated shaft ends, that such alternative construction would in effect require additional parts with respect to the housing manufacture.

Materials of fabrication are conventional and could for instance comprise pulley boxes, or other electrical or valve fittings, of a heavy die cast aluminum.

Figure 5:
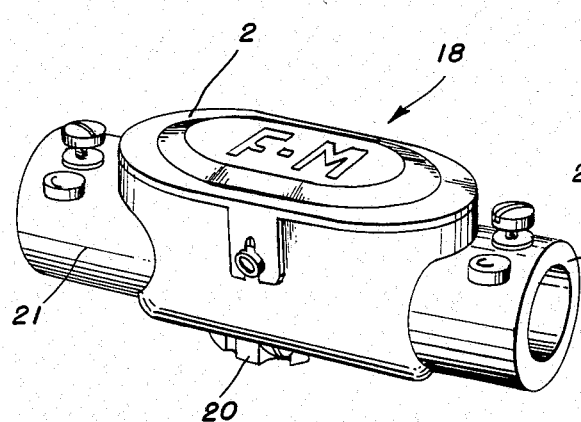
FIG. 5 is a T-type fitting embodiment of the invention.
Figure 6:
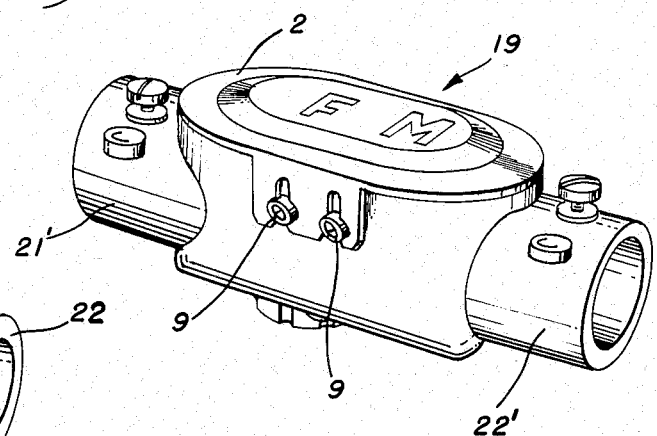
FIG. 6 is a modified T-fitting.

FIGS. 5 and 6 each illustrate the inventive concept applied to a T-type fitting and are obviously adaptable for 3-way installations through similar connectors means at 20,20'. 21,21' and 22,22'. As can be seen by the use of identical pulley shafts 9,9 in FIG. 6, the housings can be designed to accommodate more than one pulley.

While in the foregoing there has been described and shown a preferred embodiment of the invention, various modifications and equivalents may be resorted to within the spirit and scope of the invention as claimed.

What is claimed is:

1. A conduit coupler comprising a hollow housing body having opposed outer side walls, an access opening into the interior of said body, mechanism within said body and a removable cover plate which covers said access opening, the improvement comprising means facilitating easy and quick assembly and disassembly of said cover plate and housing body, said means comprising:

boss elements projecting from said opposed outer body side walls;

pairs of split ear elements extending normal from the cover plate and each element pair defining a slot means which, in assembly of the cover plate and housing body, is aligned with and adapted to receive a said boss element;

the free ends of each slot defining ear structure being divergent, whereby to facilitate reception of said boss element;

each slot defining ear structure having opposed cut-out arcuate portions adapted to accommodate said received boss element and each slot defining structure being dimensioned relative to the boss element to be received, so as to provide a snap fit for the boss element into the slot and arcuate portion thereof to thereby positively fasten the cover plate to said housing body and yet permit easy and quick cover plate removal without the use of tools, a shaft disposed within said housing in operative association with said mechanism, said shaft extending through apertures in said opposed body side walls and the thus extended shaft ends providing said boss elements which are received and snap fit in the arcuate portions of said slots.

2. The conduit coupler and mechanism therein of claim 1 wherein said mechanism comprises pulley means mounted on said shaft.

3. The conduit coupler and mechanism therein of claim 2 wherein there are plural shafts extending through the housing walls and a separate pulley is mounted on each shaft and the shaft ends are each operatively associated with a pair of said snap-on, split-ear elements.

4. The conduit coupler and mechanism therein as in claim 2 wherein the coupler comprises a T-type fitting adapted to be connected to three conduits.

5. The conduit coupler of claim 3 wherein the coupler comprises a T-type fitting adapted to be connected to three conduits.

6. A conduit coupler housing according to claim 1 wherein said coupler housing is an elbow-type fitting.

7. A conduit coupler comprising a hollow housing body having opposed outer side walls, an access opening into the interior of said body and a removable cover plate which covers said access opening, the improvement comprising means facilitating easy and quick assembly and disassembly of said cover plate and housing body, said means comprising:

boss elements projecting from said opposed outer body side walls;

pairs of split ear elements extending normal from the cover plate and each element pair defining a slot means which, in assembly of the cover plate and housing body, is aligned with and adapted to receive a said boss element;

each slot defining structure being dimensioned relative to the boss element to be received, so as to provide a snap fit for the boss element into the slot means to thereby positively fasten the cover plate to said housing body and yet permit easy and quick cover plate removal without the use of tools, mechanism within said body, and a shaft disposed within said housing in operative association with said mechanism, said shaft extending through apertures in said opposed body side walls and the thus extended shaft ends providing said boss elements which are received and snap fit into said slot means.

* * * * *